E. S. Collamer,
Lock Hinge.
No. 87,469. Patented Mar. 2, 1869.
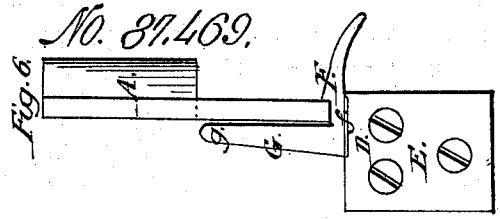
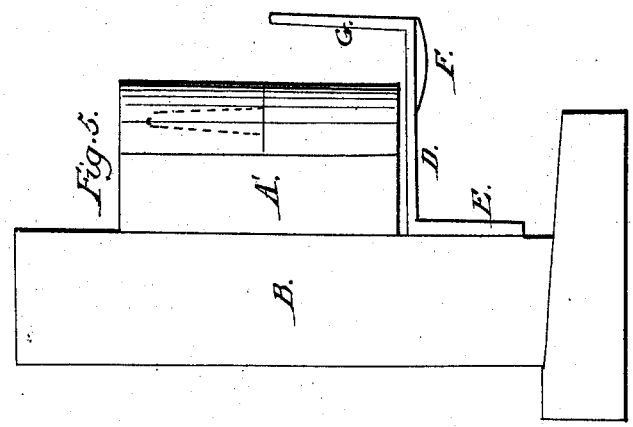
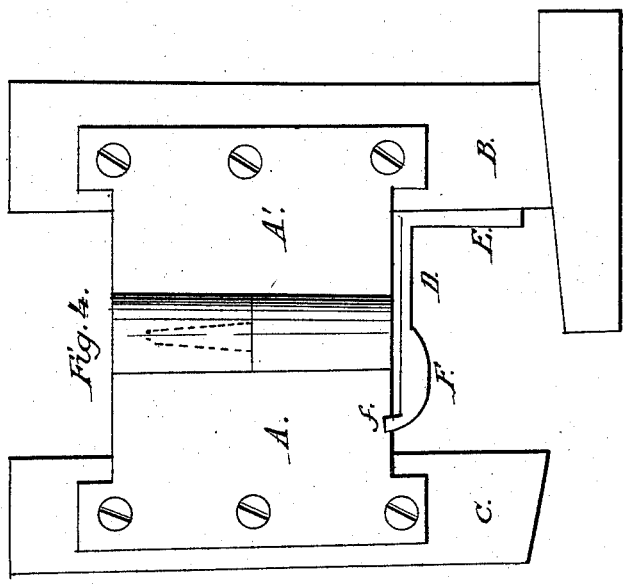
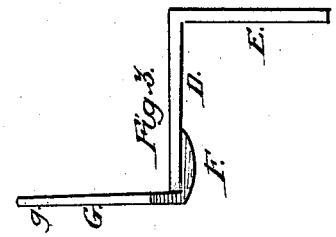
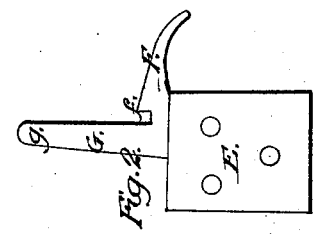
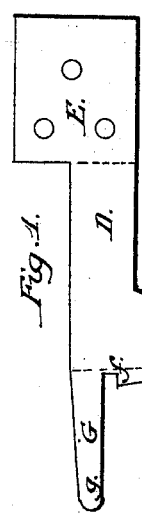
Witnesses:
H. Garrett
A. M. Tanner
Inventor:
E. S. Collamer

United States Patent Office.

EDWIN S. COLLAMER, OF GEORGETOWN, DISTRICT OF COLUMBIA.

Letters Patent No. 87,469, dated March 2, 1869.

---

IMPROVEMENT IN SHUTTER-FASTENER.

---

The Schedule referred to in these Letters Patent and making part of the same.

---

*To all whom it may concern:*

Be it known that I, EDWIN S. COLLAMER, of the city of Georgetown, District of Columbia, have invented a new and useful Improvement in Window-Blind and Shutter-Fasteners; and I do hereby declare that the following is a full, clear, and exact description thereof, which will enable others skilled in the art to make and use the same, reference being had to the accompanying drawing, forming part of this specification.

My invention has for its principal object, the partial closing of a blind, or shutter, by pressing upon a spring-catch, which catch also performs the function of holding the blind open.

This and other useful results I accomplish and secure by my present invention, by a simple device, which can be easily operated, reference being had to the accompanying plate of drawings, in which—

Figure 1 is a top view of the fastener, as it is cut from sheet-metal, before it is bent, the dotted lines showing the points at which it is to be bent.

Figure 2 is an end view of the fastener, after being bent.

Figure 3 is an edge or side view of the same.

Figure 4 is a front view of the fastener, as attached, the blind being open.

Figure 5 is a rear view of the fastener, as attached, the blind being closed.

Figure 6 is an end view of the fastener, showing the position of the fastener, and also of that portion of the but which is used on the blind, as when fastened open.

A and A′, in the drawing, represent the wings of a common but, which may be made of brass, cast-iron, or any other suitable substance.

B represents a portion of the window-frame.

C represents the blind.

D represents the spring.

E is that portion of my device which can be attached to the window-frame immediately below the but, or to the but itself.

F represents a projection, upon which pressure is applied, for the purpose of uncatching the spring, and liberating the blind, and which pressure also partially closes the blind.

*f* represents a notch in the fastener, which catches the lower part of the wing A of the but.

G is a projecting strip or standard, which, as seen in fig. 6, extends upward behind the but, and, when the spring is pressed at F, strikes against the back face of the wing A of the but, partially closing the blind.

*g* represents the extreme end of the standard G.

The operation is as follows:

In fig. 6, the blind being fastened open, then, by pressing downward and backward upon the projection F, (with but one hand,) the spring D is thrown downward, releasing the wing A of the but from the notch *f*, and, at the same time and by the same motion, the point *g* of the standard G is caused to press against the rear face of wing A of the but, and thus partially close the blind, so that, if the pressure is now removed from the projection F, the but A will not again enter the notch *f*, but will remain unfastened, and the blind can then be readily and easily closed with the same hand which caused the pressure.

Various modifications of my invention can be made, without departing from the invention, viz, any of the parts can be made longer, shorter, wider, or thicker, in proportion to the rest, than as shown in the drawing, should it, from the condition of the substance used, be found best to do so.

The part E, in place of being bent downward, can be left in a straight line with the spring D, and the projecting portion of it, E, (see fig. 1,) turned up, and fastened to the rear face of the wing A′ of the but.

The standard G can be made longer, if more, or shorter, if less action is required.

The device may also be used as it is, or in a modified form, for the purpose of fastening the blind shut, when closed, by attaching it in another manner to the blind, or some part of the house or window-frame.

Many advantages are gained by my invention, among which are the following:

It enables a person to close the blind, or shutter, by the use of one hand, (or one finger, even,) leaving the other hand free to hold up the sash, or to hold fast to the window-stool, to prevent falling out of the window.

Or, if the sash is held up by weights or otherwise, it enables a person to close both blinds at once, by using both hands.

It can be readily used in connection with nearly all forms and kinds of blind-buts now in use.

To the buts of blinds already hung, it can be applied without removing the buts from the blind or house, thereby saving much labor and defacement.

It requires no peculiar form of but to be made for it.

It enables a person to remove the blind at any time, even when fastened open.

It prevents the blind from striking the outside of the house, and, by such striking, marring the blind and the house, and causing a disagreeable noise, coming in contact with the but only to a very limited extent.

When painted, its action is not retarded by the paint, as in nearly all blind-fasteners.

Being made of flexible metal, it is very durable, and, being held in place by the force of the spring, conforms itself to the shape of the bottom of the but, and works well and closely, even when somewhat worn.

If damaged or broken, a new one can be purchased, at trifling expense, and proper repairs made, without buying a new set of buts, but, by simply attaching a new fastener, and without removing the but at all.

It is simply one light piece of metal, and can be cheaply made.

As it is light and compact, and requires no peculiar form of but to go with it, it can be easily and cheaply transported.

It fastens itself, when the blind is pushed open, and the blind is unfastened, and partially closed, by one motion of the hand, which motion is downward, and very convenient, and but half an inch in extent.

As the strain comes upon it edgewise, it will bear a great amount of pressure before breaking.

I am aware that springs for a similar purpose are in use, and am aware of the patent of Jacob Frick; but

What I claim as my invention and improvement, is—

The spring D, having the standard G, thumb-piece F, and notch $f$, constructed as described and shown, and arranged with the but, as and for the purpose described.

E. S. COLLAMER.

Witnesses:
H. GARRETT,
A. M. TANNER.